United States Patent [19]
Davis

[11] Patent Number: 5,941,987
[45] Date of Patent: Aug. 24, 1999

[54] REFERENCE CELL FOR INTEGRATED CIRCUIT SECURITY

[75] Inventor: Derek L. Davis, Phoenix, Ariz.

[73] Assignee: Intel Corporation, Santa Clara, Calif.

[21] Appl. No.: 08/777,971

[22] Filed: Dec. 24, 1996

[51] Int. Cl.⁶ .................................................. G06F 11/00
[52] U.S. Cl. ............................................................ 713/200
[58] Field of Search .............................. 395/186, 188.01, 395/187.01, 182.12, 182.2, 750.01, 750.08; 711/163; 371/21.4, 28; 705/405

[56] References Cited

U.S. PATENT DOCUMENTS

| | | | |
|---|---|---|---|
| 4,534,018 | 8/1985 | Eckert et al. .......................... 365/228 |
| 4,746,818 | 5/1988 | Hafner .................................... 307/363 |
| 4,747,057 | 5/1988 | DiGiulio et al. ....................... 364/464 |
| 4,852,044 | 7/1989 | Turner et al. ............................ 364/900 |
| 4,998,203 | 3/1991 | DiGiulio et al. .................. 364/464.02 |
| 5,379,249 | 1/1995 | Salmon .................................... 365/104 |
| 5,537,584 | 7/1996 | Miyai et al. ........................ 395/183.18 |
| 5,594,686 | 1/1997 | Hazen et al. ....................... 395/185.04 |
| 5,726,936 | 3/1998 | Whitfield ............................ 365/185.23 |

Primary Examiner—Joseph E. Palys
Attorney, Agent, or Firm—Blakely, Sokoloff, Taylor & Zafman LLP

[57] ABSTRACT

A mechanism for providing security functions for an integrated circuit device is provided. In one particular embodiment of the present invention, the integrated circuit device includes an input coupled to a voltage supply. A reference circuit coupled to the input receives a voltage from the voltage supply. The reference circuit is coupled to a security circuit which implements a control function which renders circuits within the integrated circuit electronically inaccessible for a period of time.

16 Claims, 10 Drawing Sheets

| SECURITY CELL STATE | OUTPUT STATE |
|---|---|
| PROGRAMMED | "1" (ACTIVE) |
| UNPROGRAMMED | "0" (INACTIVE) |

NORMAL SUPPLY VOLTAGE

| SECURITY CELL STATE | OUTPUT STATE |
|---|---|
| PROGRAMMED | "1" (ACTIVE) |
| UNPROGRAMMED | "0" (INACTIVE) |

MARGINALLY EXCESSIVE SUPPLY VOLTAGE

| SECURITY CELL STATE | OUTPUT STATE |
|---|---|
| PROGRAMMED | "0" (INACTIVE) |
| UNPROGRAMMED | "0" (INACTIVE) |

EXCESSIVE SUPPLY VOLTAGE

FIGURE 3B
*Prior Art*

| REFERENCE CELL STATE | OUTPUT STATE | |
|---|---|---|
| PROGRAMMED | "0" (INACTIVE) | NORMAL SUPPLY VOLTAGE |
| UNPROGRAMMED | "1" (ACTIVE) | |
| PROGRAMMED | "1" (ACTIVE) | MARGINALLY EXCESSIVE SUPPLY VOLTAGE |
| UNPROGRAMMED | "1" (ACTIVE) | |
| PROGRAMMED | "1" (ACTIVE) | EXCESSIVE SUPPLY VOLTAGE |
| UNPROGRAMMED | "1" (ACTIVE) | |

*FIGURE 4B*

| SECURITY CELL STATE | SECURITY CONTROL CIRCUIT OUTPUT STATE |
|---|---|
| PROGRAMMED | "1" (ACTIVE) |
| UNPROGRAMMED | "0" (INACTIVE) |

NORMAL SUPPLY VOLTAGE

| SECURITY CELL STATE | SECURITY CONTROL CIRCUIT OUTPUT STATE |
|---|---|
| PROGRAMMED | "1" (ACTIVE) |
| UNPROGRAMMED | "1" (ACTIVE) |

MARGINALLY EXCESSIVE SUPPLY VOLTAGE

| SECURITY CELL STATE | SECURITY CONTROL CIRCUIT OUTPUT STATE |
|---|---|
| PROGRAMMED | "1" (ACTIVE) |
| UNPROGRAMMED | "1" (ACTIVE) |

EXCESSIVE SUPPLY VOLTAGE

*FIGURE 4C*

REFERENCE CELL FOR INTEGRATED CIRCUIT SECURITY

BACKGROUND OF THE INVENTION

1. Field of the Invention

The present invention relates to securing integrated circuit ("IC") devices from unauthorized access.

2. Description of Related Art

Certain integrated circuit (IC) devices are used in situations in which they are programmed to contain "sensitive" data, which may include proprietary or confidential information including, but not limited to, proprietary system or application software. These IC devices are typically placed in systems in which the sensitive data is to be utilized, but is not meant to be electronically accessible to users. To facilitate development and debugging, these IC devices often incorporate test functions which allow a developer to interrogate the IC device and obtain information regarding the state of various internal registers or memory cells. These test functions provide an important capability for developing and debugging an IC device or a system incorporating the IC device since they allow electronic access to sensitive code or data stored in the internal memory of the IC device. These test functions, however, also introduce a degree of insecurity since they may be utilized by an unauthorized user to gain access to sensitive data stored in the IC device or to firmware performing operations on sensitive data.

To prevent the unauthorized use of the test functions to gain access to device-internal information, some IC devices incorporate one or more special memory cells or internal circuits, normally referred to as "security cells", which can be programmed to disable such test functions. When such a security cell is in one particular state (e.g., a default state), the corresponding test function is available to the developer. Conversely, when the security cell is programmed to the opposite state, the test function is disabled and unavailable.

Such security cells can also be used to disable other functions that would potentially be a security risk when the device is placed in the field. For example, in the case of a "single chip" microcontroller executing a program from internal memory on the single chip, it may be desirable to permanently prevent the microcontroller from obtaining or executing instructions from its external bus.

An example of an integrated circuit using security cells can be found in an IC device such as a microcontroller (Part No. Intel® 87C196KR™). Security cells in this device are implemented in the form of an Unerasable Programmable Read Only Memory (UPROM) circuit. This allows the manufacturer of the IC device incorporating the UPROM security cell to disable various functions of the device through simple programming. In essence, the UPROM security cell acts as a binary on/off switch for the associated function. Conventionally, the UPROM security cell is a floating-gate device which is programmed by altering the amount of charge on the floating gate. In the security cell implementation, the UPROM security cell operates functionally like a fuse. Once it is programmed (active) to disable an associated function, it cannot be returned to the inactive state which would enable the test function or any other related function. For this reason, the cell is called "unerasable".

One drawback associated with conventional UPROM security cells is that they are sensitive to variances in supply voltage. If the supply voltage for the circuit containing a programmed (active) UPROM security cell is raised above a certain voltage level, the UPROM security cell may appear unprogrammed (inactive) to the surrounding circuitry. As the supply voltage is increased above the normal operating level, the existing charge on the UPROM floating gate becomes insufficient to cause the overall UPROM circuit output to be active. The increased supply voltage does not alter the actual amount of charge on the floating gate. Instead, the higher voltage conditions create a situation in which the UPROM's output appears to be inactive. When the supply voltage is lowered to its normal level, the relative gate voltage is restored and the UPROM output is once again active.

Despite the "failure" of the UPROM security cell at a higher than normal supply level, the rest of the IC device may continue to be operational at the increased voltage level. In this case, a security vulnerability exists because the UPROM security cell is rendered inactive, causing the associated function to become enabled. Consequently, access may become available to the operational circuits within the IC device.

It will be noted by those skilled in the art, that one way to access integrated circuits and non-volatile memory devices which contain sensitive information or supply high-integrity services is to vary the external voltage in such a way as to disturb the normal operation of the device, and thereby, gain access to such information. In the case of the UPROM security cell, it is possible to utilize the various normally-disabled functions of the IC device to gain access to internal registers and memory cells by raising the supply voltage to the point at which the UPROM security cell appears inactive, yet the IC device is still at least partially active. Although the UPROM security cell is vulnerable only to increases rather than decreases in supply voltage, other embodiments of security cells may be vulnerable to either increased or decreased supply voltage levels.

It is, therefore, desirable to eliminate the vulnerability of security circuits which protect sensitive data in integrated circuit devices to variations in the supply voltage level.

SUMMARY OF THE INVENTION

The present invention discloses a circuit for maintaining the security of an integrated circuit device in an abnormal supply voltage condition. The input of the circuit is coupled to a voltage supply and to a reference circuit which receives a voltage from the voltage supply. A security circuit which serves to enable a control function is coupled to the reference cell. The control function enabled by the security circuit renders circuits within the circuit electronically inaccessible for a period of time.

In one particular embodiment of the present invention, the security circuit is embodied in a UPROM device which incorporates a UPROM reference circuit. This UPROM reference circuit generates a reference signal which is dependent upon the level of the supply voltage. The UPROM reference circuit contains a floating gate which is programmed to a particular voltage level (reference level) during manufacture of the circuit. The voltage level to which the reference circuit floating gate is programmed is chosen so as to assure that the supply voltage change required to deactivate a UPROM security circuit is greater than that which causes the UPROM reference circuit output to change value. When the supply voltage is increased to a certain level above normal operation voltage, the reference circuit becomes active. This transition in the reference circuit from an inactive state to an active state generates a reference signal. This reference signal invokes the specified security functions controlled by the security circuit, thereby assuring that the corresponding function does not become available.

These and other features of the invention will be better understood by reference to the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which:

FIG. 3B is a table showing the relationship between the programmed state of the security cell and its output under normal and abnormal supply voltage conditions.

FIG. 4B is a table showing the relationship between the programmed state of reference cell and its output under normal and abnormal supply voltage conditions.

FIG. 4C is a table showing the relationship between the output of the circuit shown in FIG. 4A and the programming of the security cell and reference cell contained therein under normal and abnormal supply voltage conditions.

DETAILED DESCRIPTION

An integrated circuit security apparatus having a UPROM security circuit and a voltage-level reference cell is disclosed. In the following description, numerous specific details, such as floating-gate devices and voltage levels, are set forth in order to provide a thorough understanding of the present invention. It will be obvious, however, to one skilled in the art that these details are not required to practice the present invention. In other instances, well known structures and devices are shown in block diagram form to facilitate explanation.

Figure 1:
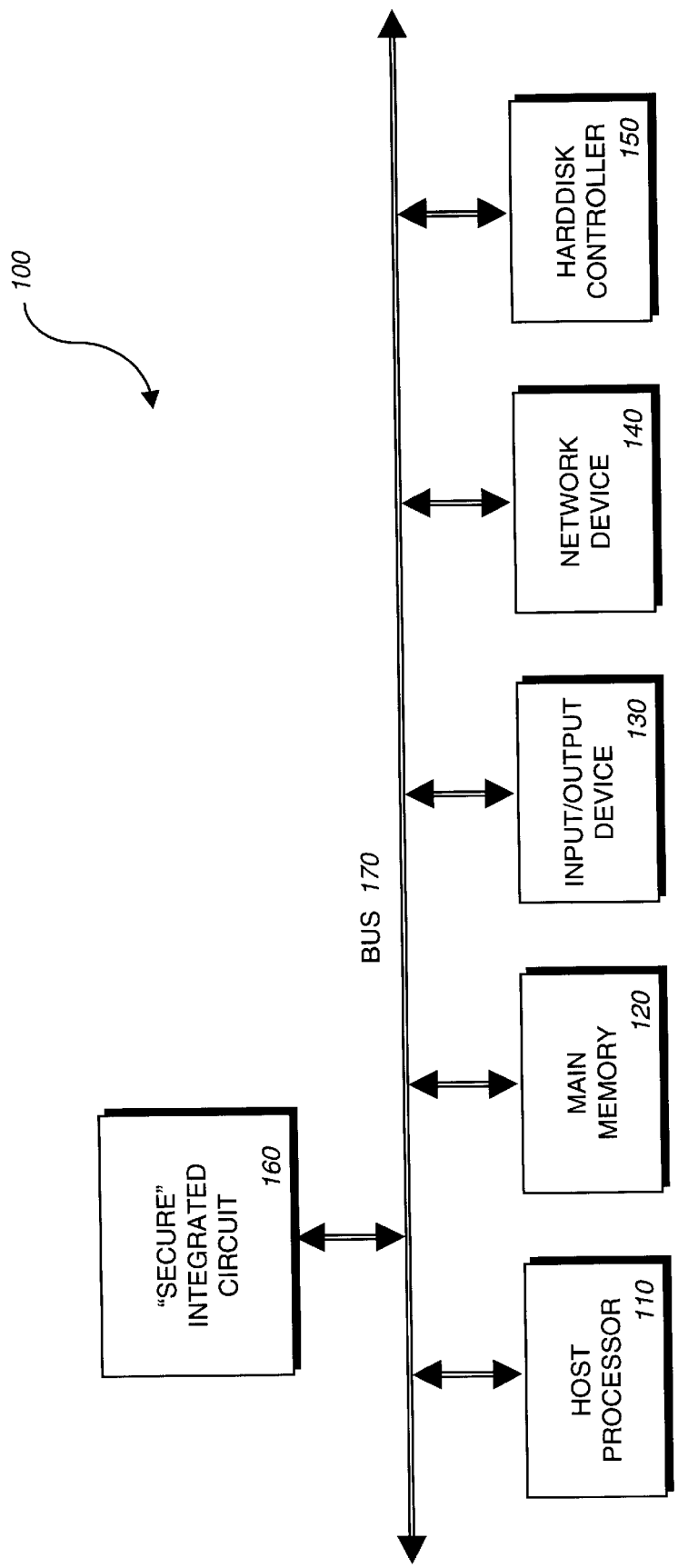
FIG. 1 is a block diagram of a computer system which may include the present invention.

FIG. 1 illustrates a typical electronic system 100 incorporating an integrated circuit ("IC") memory device 160. The IC memory device 160 may be "secure", meaning that it is virtually computationally infeasible for an individual to access information in a non-encrypted format or to successfully perpetuate fraud by tampering with such information. The electronic system 100 includes the IC memory device 160 coupled through a bus 170 to optional system elements which may include a host processor 110, memory 120, one or more input/output (I/O) devices 130, network interface devices 140, and other system elements, such as hard disk controller 150. Memory 120 could include random access memory (RAM), read only memory (ROM) devices, or other like memory devices. According to one embodiment of the present invention, the IC memory device 160 and the other elements of electronic system 100 are embodied within separate circuits or discrete components mounted on a printed circuit board or an integrated circuit card. Alternatively, the elements of electronic system 100 could be implemented and incorporated within programmable logic devices such as an Application Specific Integrated Circuit (ASIC). It should be noted that the architecture of FIG. 1 is provided primarily for illustration and that an electronic system incorporating the IC memory device 160 according to the present invention is not limited to this specific architecture.

The IC memory device 160 in electronic system 100 has been programmed to contain proprietary operating system software, device driver or network firmware, or system/user/customer data, or the like. The IC memory device 160 typically includes facilities that require sensitive information contained therein to be accessed within a physical boundary of the IC memory device 160. This is done so as to avoid exposing proprietary information under normal operation and use. Ideally, the physical boundary is formed by the package of the device itself. In such a circuit, the IC memory device 160 typically contains software to operate the system or stores data parameters required by an application being performed on the electronic system 100. In either case, the program or data contents of the IC memory device 160 are not intended to be accessible or modifiable by users of the electronic system 100. Hence, such IC memory devices are usually implemented in the form of non-volatile memory devices, such as read-only-memory (ROM), erasable-programmable read-only-memory (EPROM) devices and the like. Because such internally stored information is not accessible outside the device under normal operation, debugging of the system during development is problematic.

To facilitate system development, many ROM devices incorporate functions in which certain internal registers or memory locations can be accessed during operation of the device. These functions involve using the device in a particular test mode which renders certain portions of the device accessible. However, this test mode also provides a way in which users can gain unauthorized access to the data within the ROM device. To counteract this threat, security circuits have been developed which control enablement of the test mode. These circuits allow the device developer to program the ROM device such that the test mode is unavailable and cannot be used to access the device. Besides test modes, various other functions programmed into ROM devices may provide access to the internal circuits and registers of the ROM device.

Figure 2:
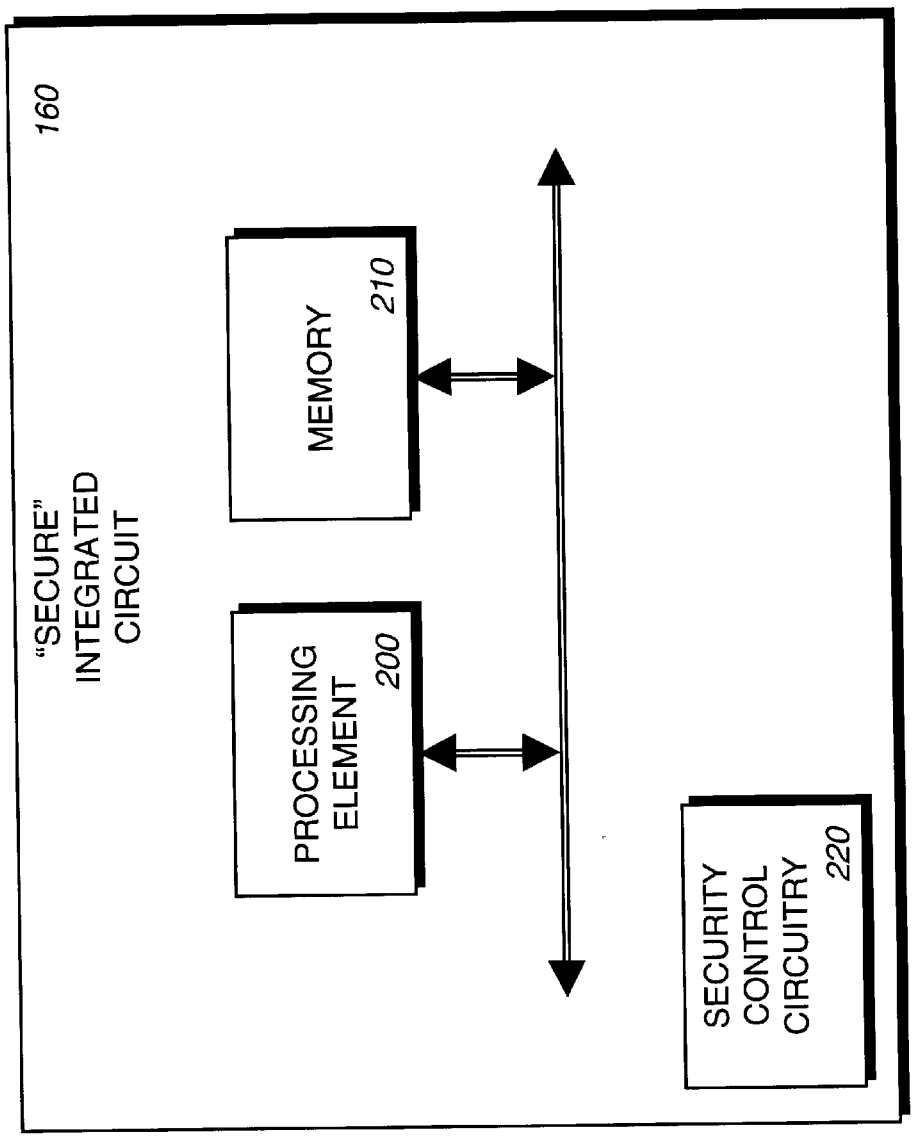
FIG. 2 is a more detailed block diagram of the secure integrated circuit of FIG. 1 which may include the present invention.

FIG. 2 is a block diagram of the IC memory device 160 of FIG. 1. The IC memory device 160 typically contains sensitive information in the form of program code or data stored in an internal memory 210. Processing element 200 operates with such sensitive information either executing code or using and modifying data. Security control circuits 220 are implemented to control the availability of special test functions and other circuit functions of the IC memory device 160.

Figure 3A:
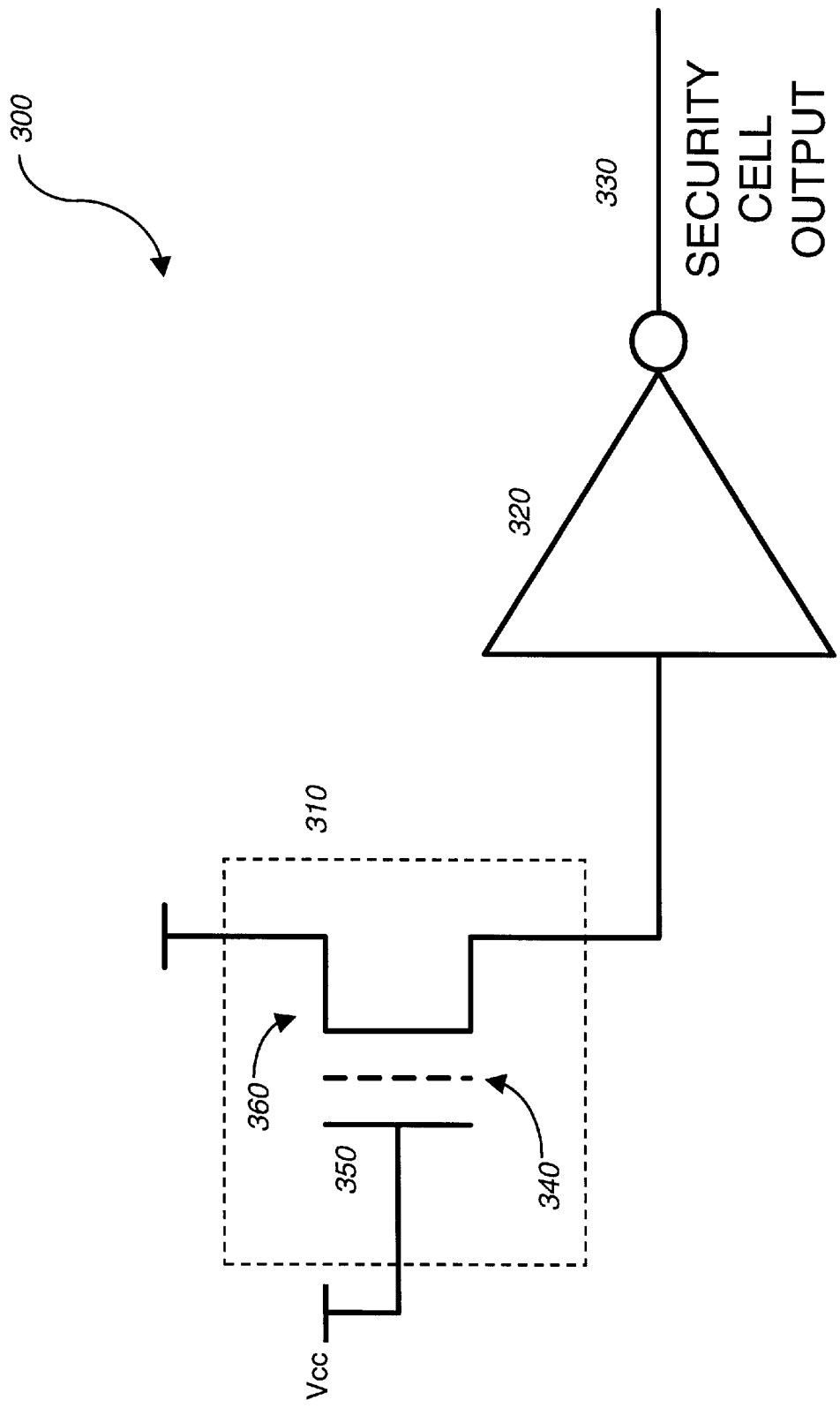
FIG. 3A is a circuit diagram of a prior art security control circuit based on a UPROM security cell controlling a test mode or other function within an integrated circuit.

FIG. 3A illustrates a security control circuit 300 (e.g., one of security control circuits 220 of FIG. 2) which is implemented with a UPROM security cell 310 within the IC memory device such as an EPROM device. The UPROM security cell 310 is a floating-gate device which is programmed by altering the amount of charge on the floating gate 340. Altering the amount of charge on the floating gate 340 changes the effective "threshold voltage" of a UPROM transistor 360 of the UPROM security cell 310. The threshold voltage is the voltage that is required on a select gate 350 in order to turn the UPROM transistor 360 on. The select gate 350 for a UPROM transistor 360 is normally tied to the supply voltage. Thus, under normal power supply conditions, if the UPROM security cell 310 is "unprogrammed", the threshold voltage is low and the UPROM transistor 360 is always on. If the UPROM security cell 310 is "programmed", the threshold voltage is raised above the select gate voltage (supply voltage) and the UPROM transistor 360 is always off. By design, the UPROM security cell 310 can only be programmed once, that is, once the charge on the floating gate 340 is set, it cannot be altered. Furthermore, the UPROM security cell 310 cannot be erased, even if it is incorporated in a memory device in which the individual general purpose memory cells can be erased such as EPROM or Electrically Erasable Programmable Read-Only-Memory ("EEPROM") devices. This is accomplished by removing the circuitry that would normally permit such erasure by electrical means and by special design and layout techniques that inhibit erasure by ultraviolet light.

A sensing circuit 320 is used to determine the on or off state of the UPROM transistor 360, providing an output 330 which is a logical representation of that state. In this example, the output is a logical "1" when the UPROM cell is programmed and a logical "0" when unprogrammed. When the UPROM cell is programmed (active), the associated function (e.g., test mode) is disabled. When the UPROM cell is unprogrammed (inactive), the associated function is enabled. Thus, when implemented as a security cell, the UPROM operates functionally like a fuse, and can be set in accordance with the use for the memory device in which it is incorporated. For example, in development systems, the UPROM can be left unprogrammed (inactive) to enable the test mode function, but in production systems, it can be programmed (active) to disable the test mode function. Again, it will be appreciated that once the UPROM is programmed, it cannot be returned to the other state.

One characteristic of UPROM devices is that they are sensitive to variances in supply voltage. At a supply voltage, which is higher than the effective threshold voltage level of the UPROM device, an existing charge on the UPROM floating gate may become insufficient to cause the overall UPROM circuit to be active. Under these conditions, an active UPROM device may behave as if it is inactive. In this case, the function controlled by the UPROM will be enabled, and consequently, the internal cells of the device incorporating the UPROM may become accessible.

The table in FIG. 3B illustrates the relationship between the programmed state of the security cell 310 and its output state 330 under various supply voltage levels. Under normal supply voltage conditions, a programmed security cell state results in an output state of logical "1" (active), and an unprogrammed security cell state results in an output state of logical "0" (inactive). In a marginally excessive supply voltage condition, the select gate voltage is set slightly higher than the floating gate voltage. Under these conditions, a programmed security cell state may still result in an output state of logical "1" (active), and an unprogrammed security cell state may still result in an output state of logical "0" (inactive). In an excessive supply voltage condition, the select gate voltage is set significantly higher than the floating gate voltage. Under these conditions, a programmed security cell state will result in an output state of logical "0" (inactive), and an unprogrammed security cell state will result in an output state of logical "0" (inactive). In this case, since the output state of the security cell reads inactive regardless of the internal state of the security cell, the associated function controlled by the security cell may be enabled.

Figure 3C:
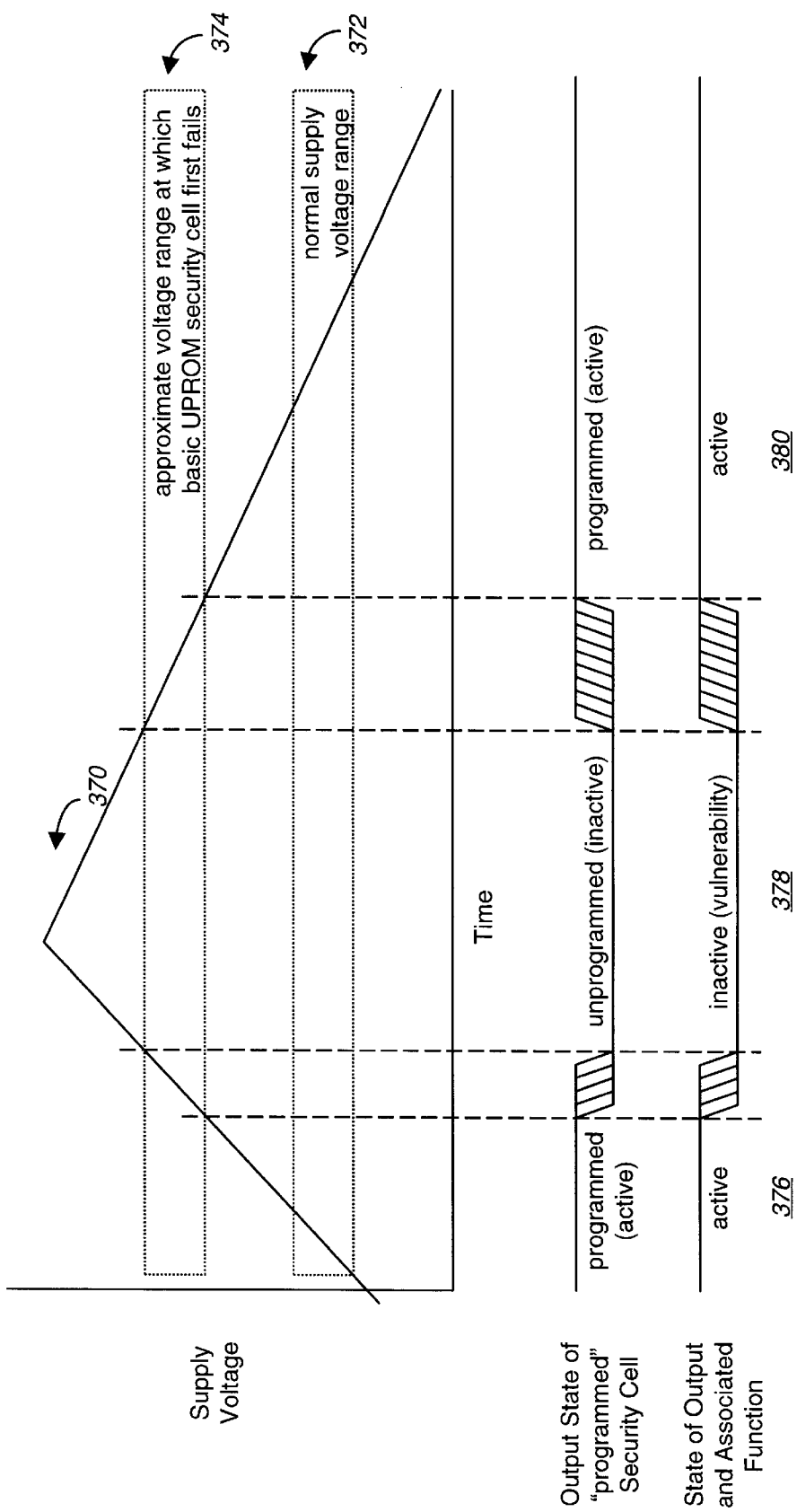
FIG. 3C is a time/voltage diagram for the prior art UPROM security cell illustrating the relationship between the security level of the UPROM as the voltage varies over time.

FIG. 3C is a graphical representation of the information presented in the table of FIG. 3B. FIG. 3C graphically shows the output state of the security cell 300 of FIG. 3A as a function of the voltage supplied to UPROM cell security 310. In FIG. 3C, function 370 represents the level of the supply voltage as it varies over time. As the supply voltage to the select gate 350 of UPROM security cell 310 is increased, the threshold voltage of the programmed UPROM transistor 360 is exceeded. This causes the sensing circuit 320 to incorrectly sense the UPROM transistor 360 as being unprogrammed and to generate an "inactive" output. At a normal operating voltage range 372, a programmed UPROM will maintain an active state, even over a period of time in which the supply voltage is increasing 376. However, as the supply voltage applied to a programmed UPROM security cell 310 is raised above a certain voltage level (the effective threshold voltage) over a period of time, the output of the security cell 300 changes state. When the supply voltage is within the excessive supply voltage range 374, over the period of time 378, the UPROM transistor 360 will appear unprogrammed (inactive). The specific point at which the transition between the normal supply voltage range and the excessive supply voltage range occurs is variable and depends on variations in the integrated circuit manufacturing process. The transition from a programmed output state to an unprogrammed output state is illustrated in FIG. 3C as the upward ramping voltage level on voltage function 370. When the supply voltage is lowered over time to its normal range 372, the relative difference between the threshold voltage and the supply voltage is restored and the UPROM transistor 360 re-enters the active state 380. This is illustrated in FIG. 3C as the downward ramping voltage level on voltage function 370. The region in which the "output" becomes inactive 378 illustrates the period of time in which the secure IC is susceptible to compromise. During this time, the UPROM security cell 300 appears inactive, hence the test mode or other associated function is enabled. If the supply voltage has not exceeded the level at which the standard ROM cells and other secure IC circuitry are operational, they are readily accessible via the normal test mode methods. In FIG. 3C, this is represented by the security level marked "vulnerability" 378.

Figure 4A:
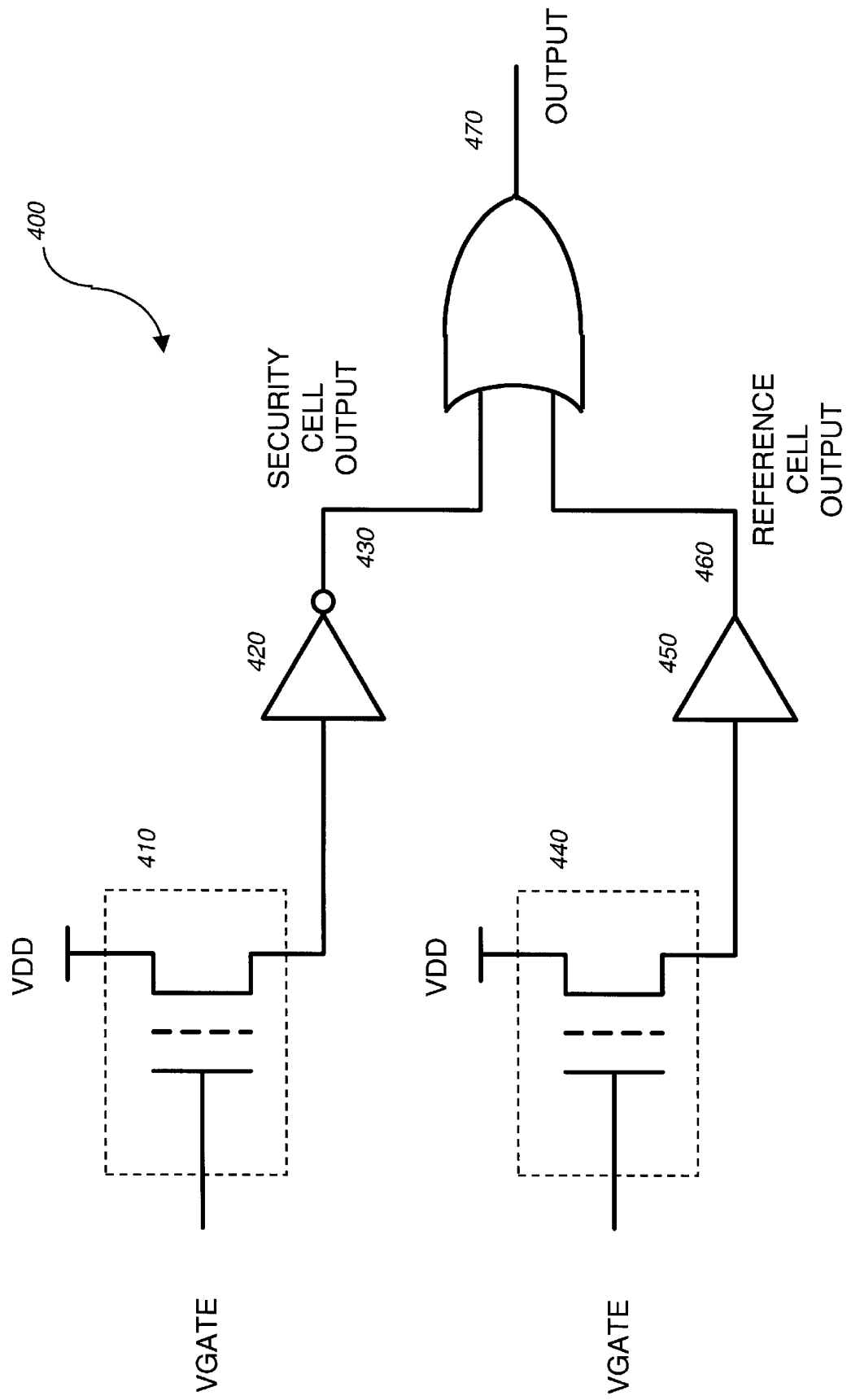
FIG. 4A is a time circuit diagram of the security control circuit based on a UPROM security cell and augmented with the UPROM reference cell.

FIG. 4A illustrates an improved UPROM security circuit 400. This security circuit incorporates a reference cell 440 which acts as a supply voltage detector and implements security control functions when it detects that the supply voltage ("VGATE") is being raised to a level which may deactivate the UPROM security cell 410. The output from reference cell 440 is input to a reference sense circuit 450 which produces a reference cell output signal 460. Similarly, the output from security cell 410 is input to a security sense circuit 420 which produces a security cell output signal 430. The reference cell output signal 460 and the security cell output signal 430 are combined in a logic gate (e.g., an OR-gate) to produce the circuit output signal 470.

In one embodiment of the present invention, the reference cell 440 is implemented in a UPROM circuit 400 similar to the UPROM security cell illustrated in FIG. 3A (and embodied in security cell 410). Like the security cell 410, the reference cell 440 comprises a floating gate which holds a programmed charge. In this embodiment, however, the UPROM security cell 410 is programmed to be inactive rather than active. This is accomplished through the use of a sensing circuit 450 which automatically inverts the logic level. When the UPROM of reference cell 440 is programmed inactive, and the supply voltage is within a normal operating range, reference cell 440 has no affect on the circuit 400. However, like the UPROM security cell 410, when the supply voltage level is increased beyond a threshold level, the reference cell 440 will appear to its corresponding sensing circuit 450 to change its output state. In this case, the reference cell 440 will change from an inactive state to an active state; namely, it will appear unprogrammed as opposed to programmed. It should be noted that although the present discussion involves a single reference cell in conjunction with a single security cell, a single reference cell could be used in conjunction with multiple security cells. In this case the activation of the single reference cell would invoke all of the security controls normally controlled by the individual UPROM security cells.

FIG. 4B contains a table which illustrates the relationship between the programmed state of the reference cell 440 and its output 460 under various supply voltage levels. Under normal supply voltage conditions, a programmed reference cell state results in an output state of logical "0" (inactive), and an unprogrammed reference cell state results in an output state of logical "1" (active). In a marginally excessive supply voltage condition, the gate voltage (VGATE) is set slightly higher than the floating gate voltage of the UPROM within reference cell 440. Under these conditions, a programmed reference cell state will result in an output state of logical "1" (active), and an unprogrammed reference cell state will also result in an output state of logical "1" (active). In an excessive supply voltage condition, the gate voltage (VGATE) is set significantly higher than the floating gate voltage of the UPROM within reference cell 440. Under these conditions, a programmed reference cell state will result in an output state of logical "1" (active), and an unprogrammed reference cell state will also result in an output state of logical "1" (active).

The table of FIG. 4B, shows that a marginal increase in the supply voltage will result in a change of state in the output of the reference cell, presuming that the floating gate of the reference cell has been appropriately programmed. This transition of output state will trigger the security control, test mode control, or any other associated security function (e.g., disabling the test mode) within the device which incorporates the UPROM security circuit 400. Because the reference cell output 460 is combined with the security cell output 430 through the logic gate 470, the security function will be triggered by the change of state of the reference cell output alone, even if the security cell output does not trigger the security function.

FIG. 4C contains a table which illustrates the state relationship between the state of the security cell 410 and the output state 470 of security circuit 400 under various voltage conditions, in the case where the incorporated reference cell 440 is "programmed". Under normal supply voltage conditions, a programmed security cell state results in an output state of logical "1" (active), and an unprogrammed security cell state results in an output state of logical "0" (inactive). In a marginally excessive supply voltage condition, the gate voltage (VGATE) is set slightly higher than the floating gate voltage of the UPROM within security cell 410. Under these conditions, a programmed security cell state will result in an output state of logical "1" (active), and an unprogrammed security cell state will also result in an output state of logical "1" (active). In an excessive supply voltage condition, the gate voltage (VGATE) is set significantly higher than the floating gate voltage of the UPROM within security cell 410. Under these conditions, a programmed security cell state will result in an output state of logical "1" (active), and an unprogrammed security cell state will also result in an output state of logical "1" (active).

Figure 4D:
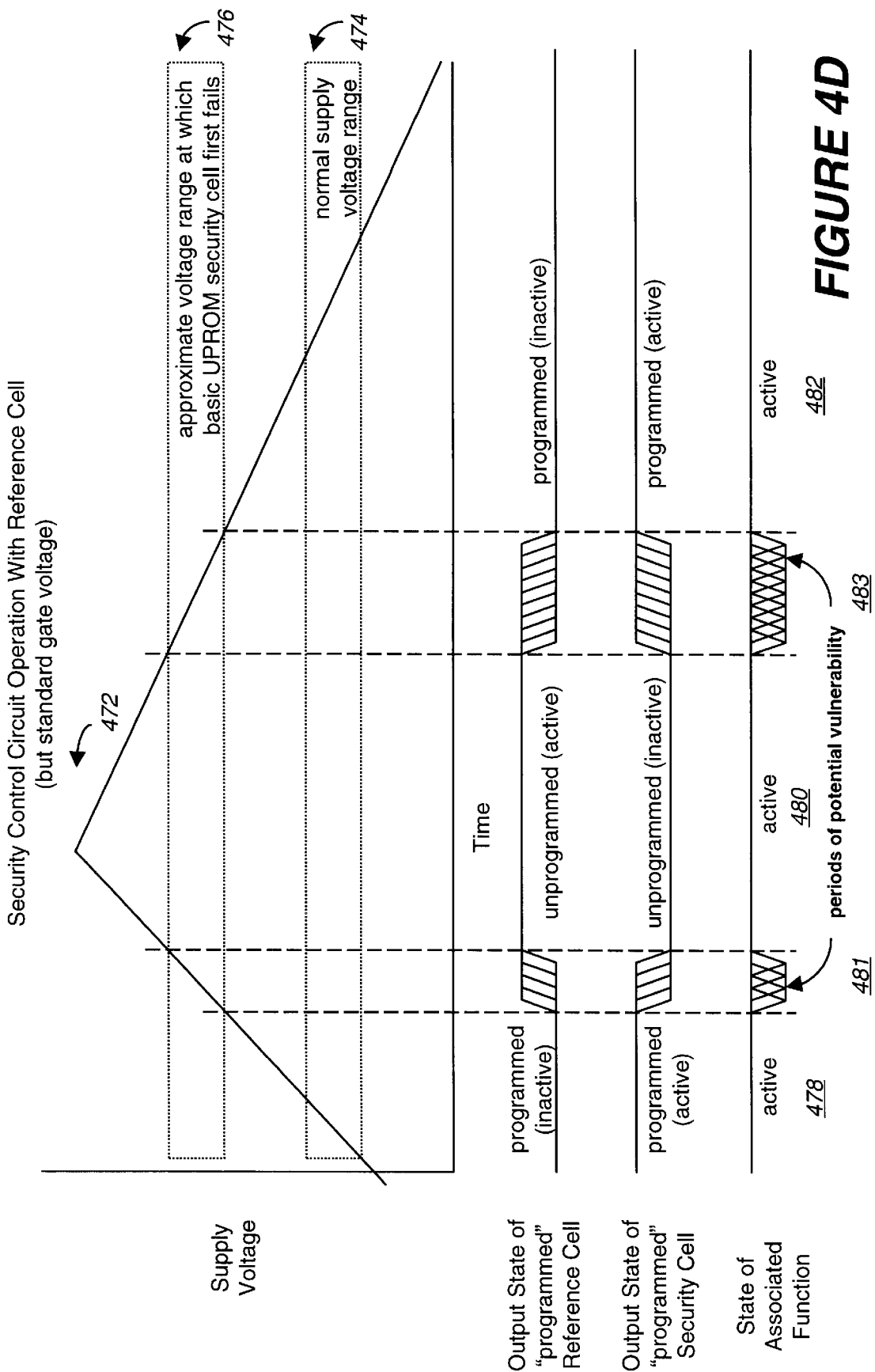
FIG. 4D is a time/voltage diagram illustrating a security device incorporating a reference cell with a floating gate threshold voltage similar to the UPROM security cell according to one embodiment of the present invention.

FIG. 4D illustrates the vulnerability of the IC memory device as the supply voltage is varied over time, according to an embodiment of the present invention in which the programmed level of the floating gate voltage of the reference cell 440 is virtually identical (within production tolerances) to the floating gate voltage of the security cell 410. In this case, the transitions between the active state and the inactive state for each of the UPROM cells within the reference cell 440 and the security cell 410 will occur almost simultaneously. The actual point of transition will vary among different UPROM devices, and is a function of manufacturing tolerances. In FIG. 4D, function 472 represents the level of the supply voltage as it varies over time. Within a normal supply voltage range 474, the output state 430 of the programmed security cell 410 will be active and the output state 460 of the programmed reference cell 440 will be inactive, both for increasing voltage over time 478, and decreasing voltage over time 482. The resulting state of the associated security function controlled by output 470 within this range is active. Within a excessive supply voltage range 476, the output state 430 of the programmed security cell 410 will be inactive and the output state 460 of the programmed reference cell 440 will be active, both for increasing voltage over time 478, and decreasing voltage over time 482. Again, the resulting state of the associated security function controlled by output 470 within this range is active. Despite the fact that the security function is active regardless of the programmed state of the reference cell 440 and the security cell 410, periods of possible vulnerability 481 and 483 exist due to possible mismatches among the UPROM floating gate voltages within the security and reference cells. The periods of vulnerability exist if the either of the following conditions occurs:

1. The security cell 410 becomes inactive before the reference cell 440 becomes active while the supply voltage is being increased; or
2. The security cell 410 becomes active after the reference cell 440 becomes inactive while the supply voltage is being decreased.

In the preferred embodiment of the present invention, the reference cell is again implemented in a UPROM cell which is programmed to be inactive rather than active. In this embodiment, however, the floating gate voltage is accurately programmed to a particular reference voltage level during the manufacture of the integrated circuit incorporating the cell. Moreover, this reference voltage level is lower than that of the programmed floating gate voltage of the security cell UPROM with sufficient margin to assure that the reference cell will become active at a lower supply voltage than that which is required to cause the security cell to become inactive.

As in embodiments previously described, when the security control circuit is under normal supply voltage and the reference cell is in its programmed state, the reference cell is actually inactive and has no affect on the device. However, like the UPROM security cell, when the supply voltage level is increased past the reference level, the UPROM reference cell will appear to its sensing circuit as changing its state. In this case, the reference cell output will change from an inactive state to an active state, appearing "unprogrammed" as opposed to "programmed". This transition will trigger the associated security control within the device. The advantage of the present embodiment lies in the fact that because the reference cell will become active at a lower voltage differential than the UPROM security cell, the security controls will be activated before the UPROM cell fails. Therefore, there will be no periods of potential vulnerability as exists in other embodiments.

Figure 4E:
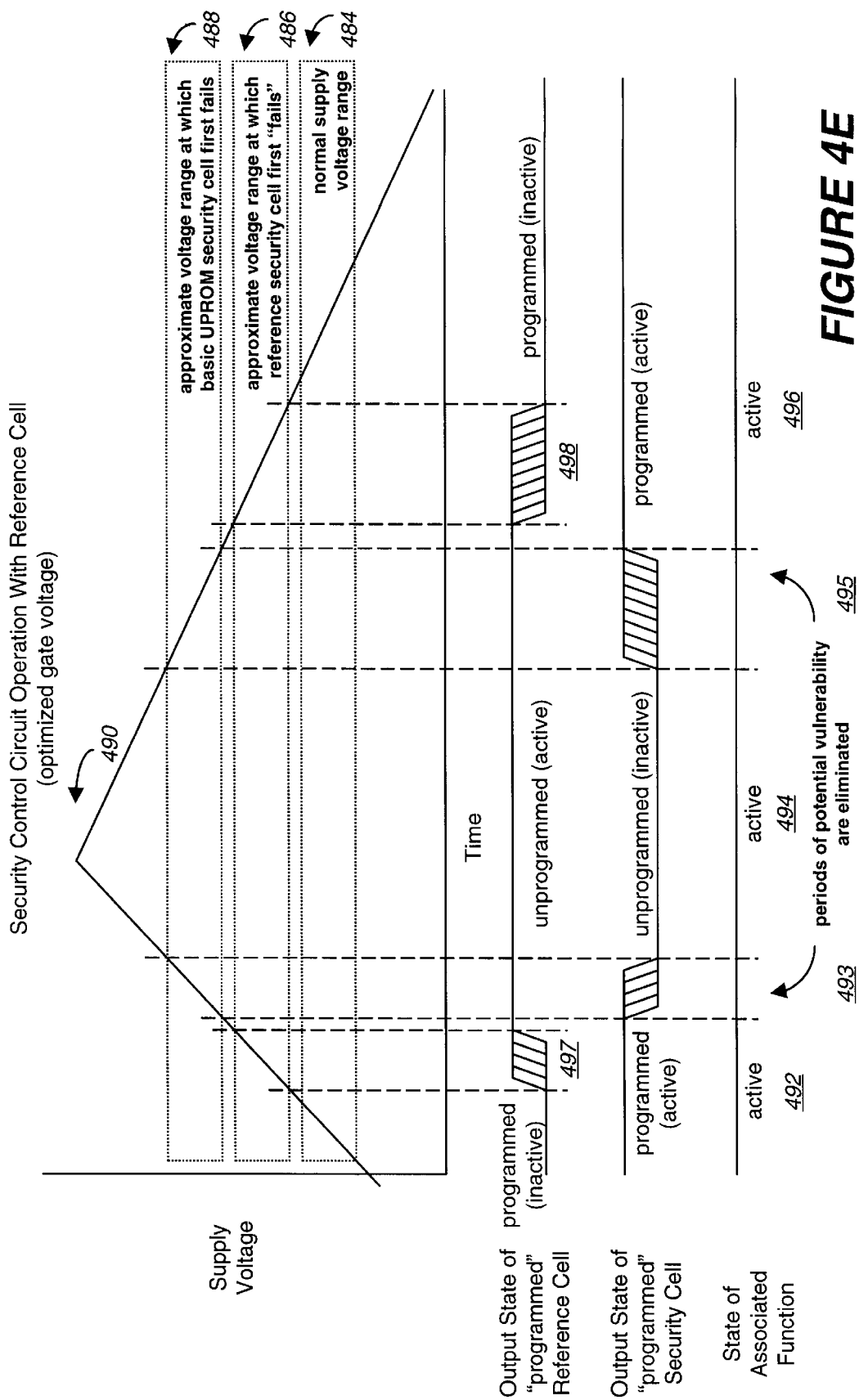
FIG. 4E is a time/voltage diagram illustrating a security device incorporating a reference cell with a floating gate threshold voltage lower than that of the UPROM security cell according to another embodiment of the present invention.

FIG. 4E illustrates the vulnerability of a secure IC as the supply voltage is varied over time, according to an embodiment of the present invention in which the programmed level of the floating gate voltage of the reference cell 440 is lower than the floating gate voltage of the security cell 410. In FIG. 4E, function 490 represents the level of the supply voltage as it varies over time. Within a normal supply voltage range 484, the output state 430 of the programmed security cell 410 will be active and the output state 460 of the programmed reference cell 440 will be inactive, both for increasing voltage over time 492, and decreasing voltage over time 496. The resulting state of the associated security function controlled by output 470 within this range is active. Within the voltage range in which the reference cell 440 will first fail 486, the output state 460 of the programmed reference cell 440 will transition 497, 498 while the output state 430 of the programmed security cell 410 will remain active. The resulting state of the associated security function controlled by output 470 within this range is for both rising voltages and decreasing voltages is active. Conversely, within the voltage range in which the security cell 410 will first fail 488, the output state 430 of the programmed security cell 410 will transition 493, 495 while the output state of the programmed reference cell 440 will remain active. Again, the resulting state of the associated security function controlled by output 470 within this range is active.

As can be seen in FIG. 4E, there are no periods of possible vulnerability of the secure IC device if the reference cell is programmed at an appropriate level. In this case, the transitions between the active state and inactive state for the reference cell will occur at a lower voltage level than the transitions for the security cell. Thus, if the voltage is being raised, the reference cell will transition before the security cell will fail, and the security measures will be invoked regardless of the state of the security cell. Likewise, if the voltage is being decreased, the reference cell will transition only after the security cell has recovered, and the reference cell will have no affect on the security measures which have been implemented by the recovered security cell.

Thus, a mechanism for ensuring the security of an IC device against varying supply voltages has been described. Although the present invention has been described in terms of specific embodiments, it will be appreciated that various modifications and alterations might be made by those skilled in the art without departing from the spirit and scope of the invention. The invention should therefore be measured in terms of the claims which follow.

What is claimed is:

1. An apparatus for providing security for an integrated circuit (IC) device, the apparatus comprising:
    an input coupled to a voltage supply;
    a security circuit coupled to said input, said security circuit implementing a control function that renders circuits within the IC device electronically inaccessible for at least some period of time; and
    a reference circuit coupled to said input, said reference circuit receiving a voltage from said voltage supply, said reference circuit including a reference cell that monitors said voltage from said voltage supply and activates said control function to render said circuits electronically inaccessible when said voltage deviates from a reference value by a particular amount, and wherein said reference circuit comprises a UPROM device comprising a floating gate circuit for the storage of a programmed charge, said programmed charge determining said particular amount that said voltage deviates from said reference value.

2. The apparatus according to claim 1, further comprising:
    an output driver coupled to said security circuit, said output driver being disabled from driving an output when said control function renders said IC device electronically inaccessible.

3. The apparatus according to claim 1, wherein said security circuit includes an Unerasable Programmable Read Only Memory (UPROM) device including a floating gate circuit for the storage of a programmed charge.

4. The apparatus according to claim 1, wherein said floating gate is charged with a specific voltage during the manufacture of said IC device.

5. An apparatus for providing security for an integrated circuit (IC) device coupled to a voltage supply, the apparatus comprising:
    an input adapted to receive a voltage from the voltage supply at a first predetermined level;
    a security circuit coupled to the voltage supply, the security circuit being programmed to a first threshold voltage and operable to enable a security function that renders circuits within said IC device electronically inaccessible for a predetermined period of time; and
    a reference circuit coupled to said voltage supply, said reference circuit being programmed to a second threshold voltage, wherein
    said security circuit comprises a first Unerasable Programmable Read Only Memory (UPROM) device, said first UPROM device including a first floating gate circuit for the storage of a programmed charge, said programmed charge representing said first threshold voltage, and
    said reference circuit comprises a second UPROM device, said second UPROM device including a second floating gate circuit for the storage of a programmed charge, said programmed charge representing said second threshold voltage.

6. The apparatus according to claim 5, wherein said reference circuit enables said security function when said voltage received by said input deviates from said first predetermined level by a second predetermined level.

7. The apparatus according to claim 6, wherein said second predetermined level is greater than or equal to said second threshold voltage.

8. The apparatus according to claim 7, wherein said second threshold voltage is less than said first threshold voltage.

9. An electronic system for executing instructions, comprising:
    a bus capable of transmitting electronic signals and voltage levels;
    a processor coupled to said bus;
    a first memory coupled to said bus; and
    a second memory coupled to the bus, said second memory including an Integrated Circuit (IC) device capable of storing data and commands related to the instructions, the IC device including an input receiving a voltage level transmitted by said bus, a security circuit that enables a security function rendering said data and commands electronically inaccessible upon the occurrence of a specific event, said security circuit comprising a first Unerasable Programmable Read Only Memory (UPROM) device, said first UPROM device including a first floating gate circuit for the storage of a first programmed charge, and a reference circuit coupled to said security circuit, said reference circuit enabling said security function if said voltage level received by said input exceeds a predetermined level, said reference circuit comprising a second UPROM device, said second UPROM device including a second floating gate circuit for the storage of a second programmed charge said second programmed charge determining said predetermined level exceeded by said voltage level.

10. The electronic system according to claim 9, wherein said processor, said first memory, and said second memory comprise discrete devices mounted on a printed circuit board, and said bus comprises trace wiring connected between said discrete devices.

11. The electronic system according to claim 9, wherein said processor, said first memory, and said second memory comprise integrated circuit devices are embodied in a single semiconductor substrate.

12. A method of providing security functions in an integrated circuit (IC) device, the method comprising the steps of:

providing an input voltage to an input circuit in said IC device;

programming an Unerasable Programmable Read Only Memory (UPROM) security circuit within said IC device to a first threshold voltage level, said security circuit enabling a security function which renders circuits within said IC device electronically inaccessible if said input voltage level received exceeds a predetermined level, said security circuit including a first floating gate circuit for the storage of a first programmed charge; and programming a UPROM reference circuit within said IC device to a second threshold voltage level, said reference circuit including a second floating gate circuit for the storage of a second programmed charge, said second programmed charge determining said predetermined level exceeded by said voltage level.

13. The method of providing security functions in an integrated circuit (IC) device according to claim 12, further comprising the step of:

enabling said security function if said input voltage deviates from a predetermined level, said predetermined level exceeding said second threshold level and not exceeding said first threshold level.

14. An apparatus comprising:

a voltage source;

an Unerasable Programmable Read Only Memory (UPROM) security circuit coupled to said voltage source and including a first floating gate circuit storing a first programmed charge;

a UPROM reference circuit coupled to said voltage source, and including a second floating gate circuit storing a second programmed charge;

a logic circuit coupled to an output of said security circuit and an output of said reference circuit, wherein said logic circuit outputs a security signal, said security signal enabling a security function that renders circuits within an integrated circuit device electronically inaccessible when said security signal is at a first logic level, and wherein said logic circuit is a logic OR gate and said security signal is output at said first logic level if either said output of said security circuit is at a logic high level or said output of said reference circuit is output at a logic high level, and wherein said security circuit is operable to output a logic high signal when said first programmed charge is set to a first predefined threshold voltage level relative to a voltage output from said voltage source, and said reference circuit is operable to output a logic high signal when said voltage output from said voltage source exceeds said first predefined threshold level by a second predefined threshold voltage level.

15. The apparatus according to claim 14, wherein said first predefined threshold level is approximately equal to said second predefined threshold level.

16. The apparatus according to claim 15, wherein said second predefined threshold level is lower than said first predefined threshold level.

* * * * *